United States Patent
Somasundaram et al.

(10) Patent No.: US 11,256,531 B2
(45) Date of Patent: Feb. 22, 2022

(54) ISOLATING PHYSICAL PROCESSORS DURING OPTIMIZATION OF VM PLACEMENT

(71) Applicant: International Business Machines Corporation, Armonk, NY (US)

(72) Inventors: Muruganandam Somasundaram, Poughkeepsie, NY (US); Jeffrey Paul Kubala, Poughquag, NY (US); Seth E. Lederer, Staatsburg, NY (US); Jeffrey G. Chan, Fishkill, NY (US); Jerry A. Moody, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 16/447,505

(22) Filed: Jun. 20, 2019

(65) Prior Publication Data
US 2020/0401435 A1     Dec. 24, 2020

(51) Int. Cl.
*G06F 9/455*     (2018.01)
*G06F 9/46*      (2006.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
USPC .......................................................... 718/1
See application file for complete search history.

(56) References Cited

U.S. PATENT DOCUMENTS

| 7,739,434 | B2* | 6/2010 | Farrell | G06F 9/44505 710/104 |
|---|---|---|---|---|
| 9,325,742 | B1* | 4/2016 | Barsness | H04L 63/20 |
| 9,582,328 | B1* | 2/2017 | Tao | G06N 5/02 |
| 10,055,258 | B2 | 8/2018 | Birkestrand et al. | |
| 10,148,743 | B2 | 12/2018 | Birkestrand et al. | |
| 2009/0182915 | A1* | 7/2009 | Farrell | G06F 15/76 710/104 |
| 2009/0182979 | A1* | 7/2009 | Farrell | G06F 9/30003 712/200 |

(Continued)

OTHER PUBLICATIONS

Gohil, et al.; "A Comparative Analysis of Virtual Machine Placement Techniques in the Cloud Environment", International Journal of Computer Applications (0975-8887), vol. 156, No. 14, Dec. 2016, pp. 12-18.

(Continued)

*Primary Examiner* — Bradley A Teets
(74) *Attorney, Agent, or Firm* — Stephanie L. Carusillo

(57) ABSTRACT

In an approach for isolating physical processors during optimization of virtual machine placement, a server is provided comprising a plurality of containers and a plurality of physical processors. A processor builds a set of bit masks for each type of physical processor required for a logical partition. A processor builds a set of solution spaces based on the plurality of containers and an amount of each type of container of the plurality of containers. A processor completes a combinatorial search of the set of bitmasks and the set of solution spaces. A processor identifies a solution space of the set of solution spaces for the logical partition. The physical and logical configuration of the server is changed based on the solution space for the first logical partition.

17 Claims, 3 Drawing Sheets

(56) References Cited

U.S. PATENT DOCUMENTS

2010/0180275 A1\* 7/2010 Neogi .................. G06F 1/3203
                                                                                                          718/1
2013/0263120 A1 10/2013 Patil et al.

OTHER PUBLICATIONS

IPCOM000180995D; "A Method and System for the Cost-Optimal Placement of Virtual Machines Under Security Constraints", An IP.com Prior Art Database Technical Disclosure, IP.com No. IPCOM000180995D, IP.com Electronic Publication Date: Mar. 23, 2009, 4 pps., <https://ip.com/IPCOM/000180995>.

IPCOM000197321D; "Enhanced Memory Usage Based on Optimized Virtual Machine Placement", An IP.com Prior Art Database Technical Disclosure, IP.com No. IPCOM000197321D, IP.com Electronic Publication Date: Jul. 2, 2010, 4 pps., <https://ip.com/IPCOM/000197321>.

IPCOM000255886D; "Method and System for Placement of Virtual Machines (VM) on a Server by Prioritizing Partition Size", An IP.com Prior Art Database Technical Disclosure, IP.com No. IPCOM000255886D, IP.com Electronic Publication Date: Oct. 18, 2018, 5 pps., <https://ip.com/IPCOM/000255886>.

Kim, et al.; "Virtual Machine Placement for Network Isolation in Clouds", RACS '12, Oct. 23-23, 2012, ACM 978-1-4503-1492— Mar. 12, 2010, 6 pps.

Mann,; "Multicore-Aware Virtual Machine Placement in Cloud Data Centers", 18 pps., Article in IEEE Transactions on Computers, Nov. 2016, vol. 65, No. 11, ResearchGate, <https://www.researchgate.net/publication/294277946>.

\* cited by examiner

ISOLATING PHYSICAL PROCESSORS DURING OPTIMIZATION OF VM PLACEMENT

BACKGROUND

The present invention relates generally to the field of virtual machines, and more particularly to optimizing placement of logical partitions for virtual machines.

A virtual machine (VM) is an emulation of a computer system. VMs are based on computer architectures and provide the functionality of a physical computer. VM implementations may involve specialized hardware, software, or a combination. A system VM provides a substitute for a real machine and provides the functionality needed to execute entire operating systems. A hypervisor is computer software, firmware, or hardware that creates and runs VMs. There are two types of hypervisors: type-1, native or bare-metal hypervisors and type-2 or hosted hypervisors. Type-1 hypervisors run directly on the host's hardware (e.g., a server) to control the hardware and to manage guest operating systems. A multi-processor server can have multiple different types of physical processors.

SUMMARY

Aspects of an embodiment of the present invention disclose a method, computer program product, and computer system for isolating physical processors during optimization of VM placement on a multi-processor server. A server is provided comprising a plurality of containers and a plurality of physical processors. A processor builds a set of bit masks for each type of physical processor required for a logical partition. A processor builds a set of solution spaces based on the plurality of containers and an amount of each type of container of the plurality of containers. A processor completes a combinatorial search of the set of bitmasks and the set of solution spaces. A processor identifies a solution space of the set of solution spaces for the logical partition. The physical and logical configuration of the server is changed based on the solution space for the first logical partition.

DETAILED DESCRIPTION

Figure 1:
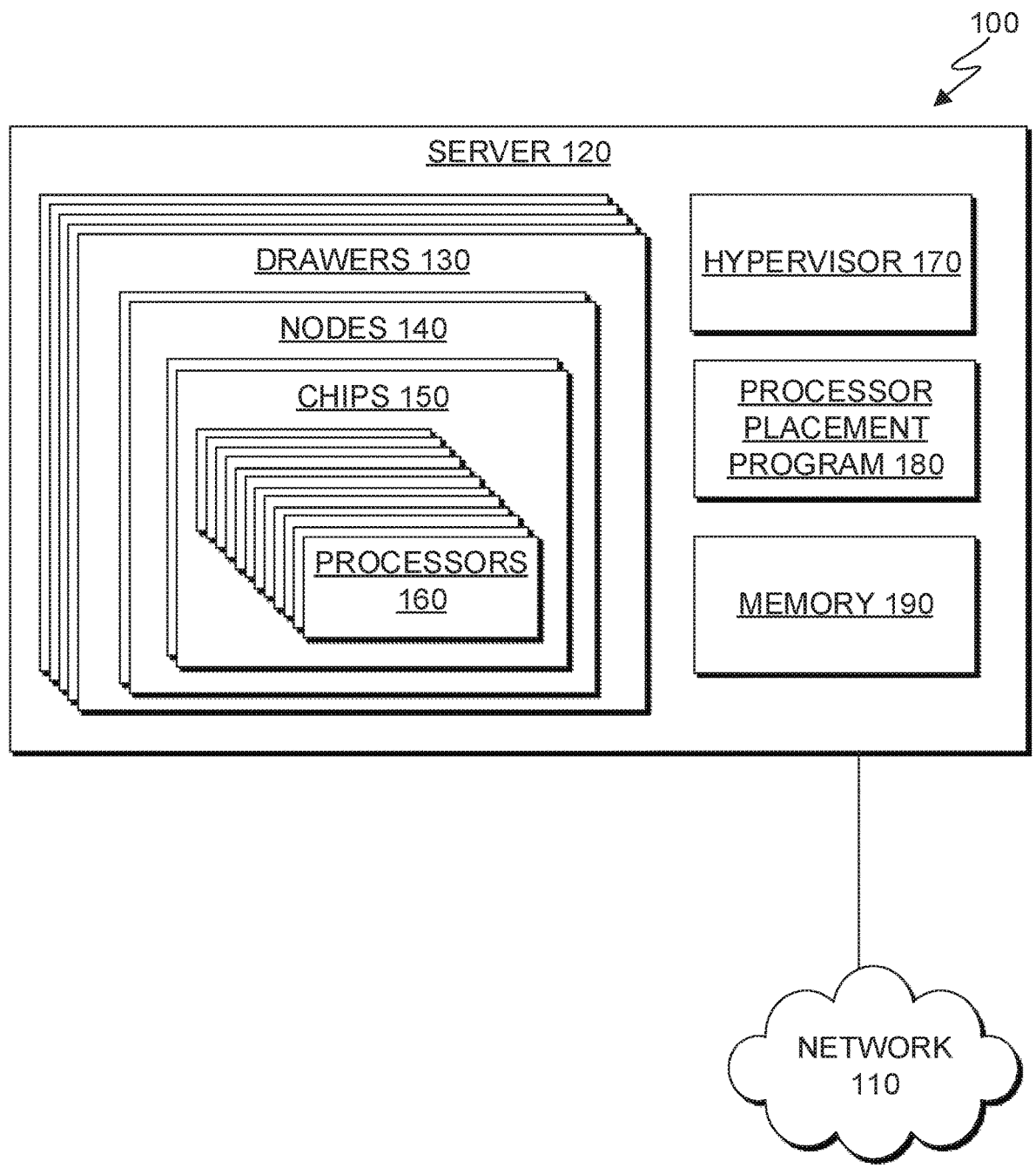
FIG. 1 depicts a functional block diagram of a VM computing environment, in accordance with an embodiment of the present invention.

Embodiments of the present invention recognize that a hypervisor running on a server system can host many logical partitions (virtual machines), e.g., one current system can host up to 85 logical partitions. Given the physical topology of the server system and the server system's ability to host many logical partitions, the hypervisor can have a built-in process that runs frequently to look at where the logical partitions are residing on the server system and whether the logical partitions can be optimized. In one embodiment, a server system running a hypervisor can comprise one to five drawers, two nodes in each drawer, two chips on each node, and up to twelve physical processors on each chip. The server system can have multiple different types of physical processors Given that each of the physical processor types run different workloads, embodiments of the present invention recognize that having different physical processor types reside on the same chip can cause cache pollution and performance penalties. For example, one type of processor runs a certain type of workload and if during logical partition placement, two types of processors are placed on the same chip, those two types of processors end up sharing cache and cause a performance penalty. Therefore, embodiments of the present invention can isolate physical processors of one type on each chip during optimization of logical partition placement.

Embodiments of the present invention provide a program that identifies a mask that represents a container (e.g. a chip, a node, or a drawer) within a system for each type of physical processor. Embodiments of the present invention provide a program that isolates physical processors of one type to a container chosen or pre-determined as the boundary for each type of physical processor of the system. In other words, one type of container is chosen to house one type of physical processor. For example, in a system in which a chip has been chosen as the boundary, each chip will house one type of physical processor. In another example, in a system, in which a chip has been chosen as the boundary, with 20 chips, a 20-bit mask represents the entire system. Embodiments of the present invention build a mask for each type of physical processor with a 1 implying that the container associated with the position can be considered for placement of physical processors of a certain type. For example, in a system with 16 chips, the program builds a 20-bit mask 0100 0001 0001 0001 for type A physical processor, in which each digit corresponds to chips 1-16, and so, chips 2, 8, 12, and 16 can be considered for placement of type A physical processor. A mask is built based on the number of physical processors of each type and the number of processors available on the container chosen as the boundary. The masks for each type ensure there are minimal to zero overlaps of types of physical processors.

Embodiments of the present invention recognize that a logical partition requires memory and central processing units (CPUs), physical processors. The placement of a logical partition follows an optimization algorithm that identifies a solution space where the logical partition's physical processors and memory will fit by searching spaces within the server system, e.g., a chip, a node, a drawer, and then instantiates the solution space by changing the logical configuration. Embodiments of the present invention provide an improved placement program that isolates physical processors of one type on each chip of the system using bitmasks.

The present invention will now be described in detail with reference to the Figures.

FIG. 1 depicts a functional block diagram illustrating multi-processor computing environment 100, in accordance with an embodiment of the present invention. FIG. 1 provides only an illustration of one embodiment of the present invention and does not imply any limitations with regard to the environments in which different embodiments may be implemented. In the depicted embodiment, multi-processor computing environment 100 includes server 120 connected to network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between server 120 and another computing device (not shown). Multi-processor computing environment 100 may include additional servers, computers, or other devices not shown.

Server 120 operates as a multi-processor computing system with drawers 130, nodes 140, chips 150, processors 160, hypervisor 170, processor placement program 180, and memory 190. In some embodiments, server 120 may be a management server, a web server, or any other electronic device or computing system capable of receiving and sending data. Hypervisor 170 operates as program to manage the collection of resources of server 120 to implement logical partitions or virtual machines. Memory 190 operates as place to hold one or more programs with computer readable program instructions and data that processors 160 can act on directly. In the depicted embodiment, server 120 comprises a set of five drawers 130, a set of two nodes 140 on each drawer 130, a set of two chips 150 on each node 140, and a set of twelve processors 160 on each chip 150. In other embodiments, server 120 may have any different number of drawers 130, nodes 140, chips 150, and processors 160. Server 120 may include components as described in further detail in FIG. 3.

Drawers 130 operate as a collection of one or more nodes, such as nodes 140. In the depicted embodiment, server 120 comprises five drawers 130, and each drawer 130 has two nodes 140. In other embodiments, server 120 may have any different number of drawers 130. In an embodiment, drawers 130 have a dedicated cache shared among nodes 140 and/or a communication bus interconnecting nodes 140 of a drawer of drawers 130. In an embodiment with more than one drawer 130, there is a communication bus between drawers 130 to communicate off drawer, at typically slower speeds than on drawer communication.

Nodes 140 operate as a collection of one or more chips, such as chips 150. In the depicted embodiment, each drawer 130 comprises two nodes 140, and each node 140 comprises two chips 150. In other embodiments, server 120 may have any different number of nodes 140. In an embodiment, nodes 140 have a communication bus interconnecting chips 150 and have a dedicated cache shared among chips 150.

Chips 150 operate as a collection of one or more central processing units (CPUs), such as processors 160. In the depicted embodiment, each node 140 comprises two chips 150, and each chip 150 comprises twelve processors 160. In other embodiments, server 120 may have any different number of chips 150. In an embodiment, chips 150 share some amount of high-speed local cache with high speed communication bus between the CPUs on the same chip.

Processors 160 operate as general-purpose engines that execute a set of instructions from a program, e.g., a hypervisor, such as hypervisor 170. In the depicted embodiment, each chip 150 comprises twelve processors 160. In other embodiments, server 120 may have any different number of processors 160. In several embodiments, processors 160 comprises multiple different types of processors. For example, server 120 may comprise three different types of processors: processor type A, processor type B, and processor type C. In some embodiments, two types of processors may be required by the system to co-exist on a chip, and so can be grouped together. For example, server 120 may comprise four different types of processors: processor type A, processor type B, processor type C, and processor type D, in which processor type A and processor type B are required to co-exist; therefore, the system has three types or groups of processors: processor type A and B, processor type C, and processor type D.

Processor placement program 180 operates as a program for optimizing placement of physical processors in a server system by isolating physical processors of one type or group to a container. In an embodiment, processor placement program 180 builds bit masks for each type or group of physical processors and builds a set of solution spaces. In an embodiment, processor placement program 180 does a combinatorial search of spaces in server system using the bit masks for each type or group of physical processors and the set of solution spaces. If a resulting bit is a 1, processor placement program 180 identifies the chip for placement of physical processors of certain type or group. In an embodiment, processor placement program 180 repeats this search for each partition using spaces remaining after each search and placement. In an embodiment, processor placement program 180 changes the physical and logical configuration based on the solution spaces. In the depicted embodiment, processor placement program 180 resides on server 120. In other embodiments, processor placement program 180 may reside within hypervisor 170 or on another computing device (not shown), provided that processor placement program 180 has access to server 120 via network 110.

Figure 2:
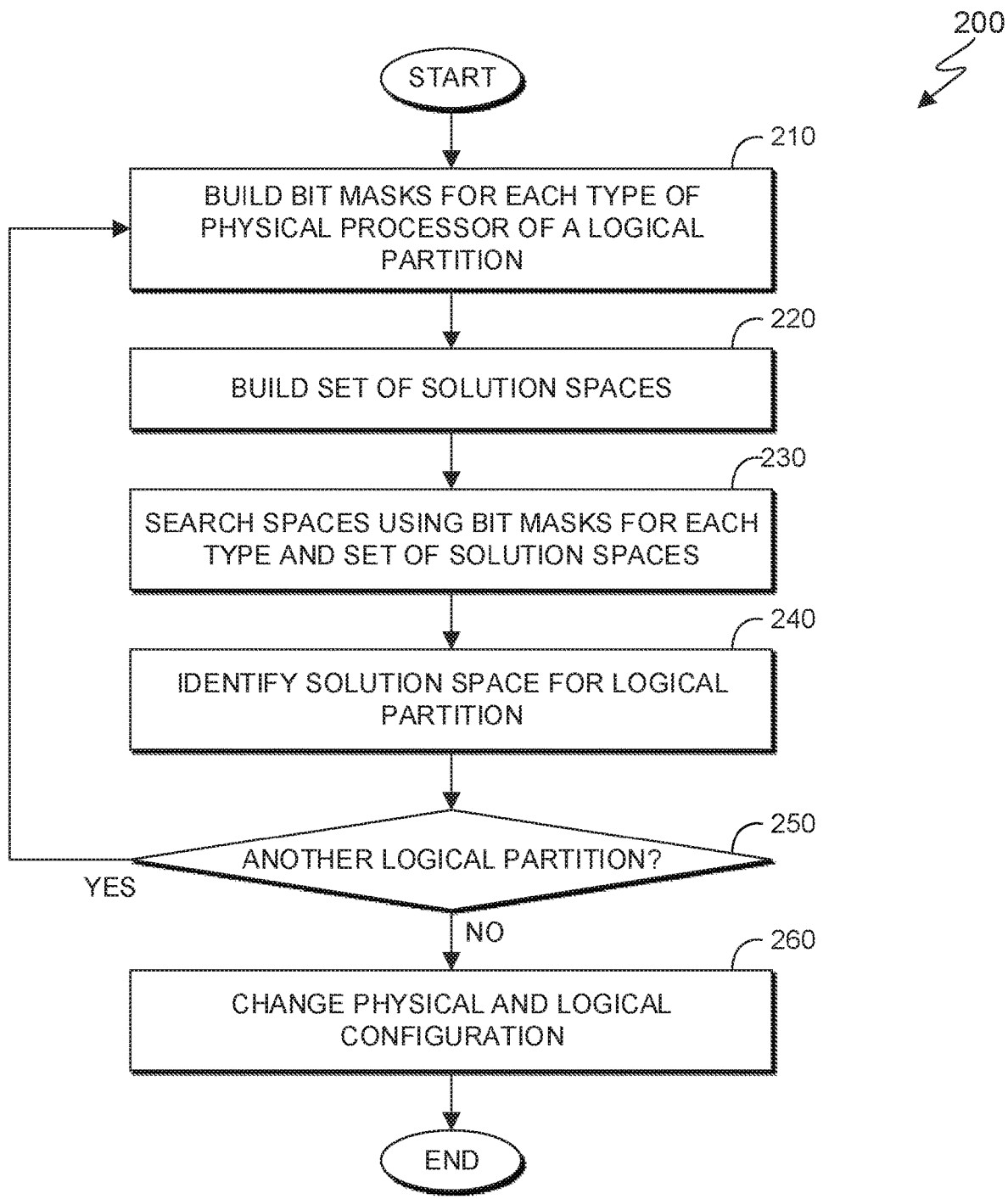
FIG. 2 depicts a flow chart of the steps of a processor placement program, in accordance with an embodiment of the present invention.

FIG. 2 depicts a flowchart 200 of the steps of processor placement program 180, in accordance with an embodiment of the present invention. In an embodiment, processor placement program 180 isolates physical processors by type during optimization of logical partition placement on a multi-processor server. It should be appreciated that the process depicted in FIG. 2 illustrates one possible iteration of the process flow, which repeats for each optimization done by the system.

In step 210, processor placement program 180 builds a bitmask for each type or group of physical processors of a logical partition. In an embodiment, processor placement program 180 builds a bitmask for each type or group of physical processors of a length equal to the number of containers chosen or pre-determined as the boundary in the system. For example, in a system, in which a chip has been chosen or pre-determined as the boundary, that has three physical processor types and three chips, processor placement program 180 builds three bitmasks that are 3 bits long. In an embodiment, processor placement program 180 builds each bitmask based on the number of physical processors of each type and the number of processors available on the container chosen as the boundary. For example, where a logical partition has 9 physical processors of type A, 7 physical processors of type B, and 4 physical processors of type C; and in a 3-chip system, a first chip has 10 physical processors, a second chip has 8 physical processors, and a third chip has 6 physical processors, processor placement program 180 builds the bitmask for physical processors of type A to be 100, the bitmask for physical processors of type B to be 010, and the bitmask for physical processors of type C to be 001. After a solution space is identified for a logical partition (step 240 below), this step is repeated for the next logical partition, and so on until all the logical partitions of the server system have been placed.

In step 220, processor placement program 180 builds a set of solution spaces. In an embodiment, processor placement program 180 builds a set of solution spaces based on the containers of the server system and the number of each type of container. The set of solution spaces comprise all possible solutions for each type of container. For example, in a server system with 2 drawers, 4 nodes, and 8 chips, a set of solution spaces comprise all possible one chip solutions, all possible one node solution, all possible one drawer solution, and all possible two drawer solutions. The set of solution spaces would comprise one chip solutions: 1000 0000, 0100 0000, 0010 0000, 0001 0000, 0000 1000, 0000 0100, 0000 0010, 0000 0001; one node solutions: 1100 0000, 0011 0000, 0000 1100, 0000 0011; one drawer solutions: 1111 0000, 0000 1111; and two drawer solution: 1111 1111. This step is repeated for each logical partition of the server system with the solution spaces still available after a preceding logical partition is placed, and so on until all the logical partitions of the server system have been placed.

In step 230, processor placement program 180 searches spaces using the bitmasks for each type of physical processor and the set of solution spaces. In an embodiment, processor placement program 180 completes a combinatorial search between every combination of the bitmasks for each type of physical processor and the set of solution spaces using bitwise operator AND.

In step 240, processor placement program 180 identifies a solution space for the logical partition. In an embodiment, processor placement program 180 identifies a solution space as each combination from the search that resulted in a 1, meaning the solution space is a fit for the logical partition. In an embodiment, processor placement program 180 identifies solution space for each type of physical processor of the logical partition. For example, in a server system with 10 chips, for a first logical partition with two types of physical processors, processor placement program 180 identifies chips 1-8 for the first type of physical processor and chips 9-10 for the second type of physical processor.

In decision 250, processor placement program 180 determines whether there is another logical partition. If processor placement program 180 determines there is another logical partition (decision 250, YES branch), then processor placement program 180 proceeds back to step 210. If processor placement program 180 determines there is not another logical partition (decision 250, NO branch), then processor placement program 180 proceeds to step 260.

In step 260, processor placement program 180 changes the physical and logical configuration. In an embodiment, processor placement program 180 changes the physical and logical configuration of the server system according to the solution spaces identified for each logical partition. For example, if a first logical partition was on a first chip, and then the search identifies that the first logical partition should be on a second chip, processor placement program 180 changes the logical and physical configuration of the logical partition from the first chip to the second chip.

Figure 3:
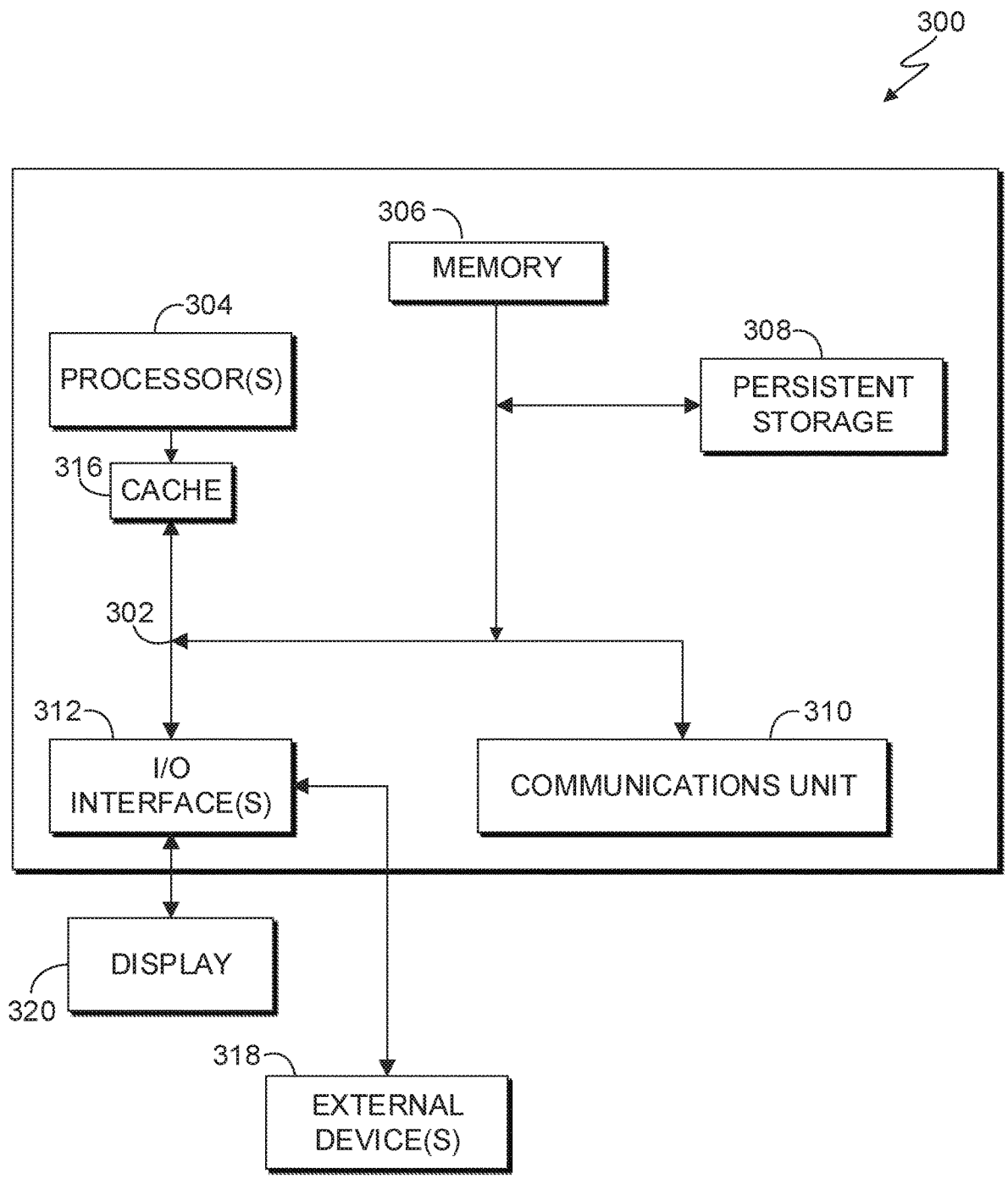
FIG. 3 depicts a block diagram of a server of VM computing environment, in accordance with an embodiment of the present invention.

FIG. 3 depicts a block diagram of computer 300 suitable for server 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Processor placement program 180 may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs, such as processor placement program 180, may be downloaded to persistent storage 308 through communications unit 310.

I/O interface(s) 312 allows for input and output of data with other devices that may be connected to server 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Processor placement program 180 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for isolating physical processors during optimization of virtual machine placement, the computer-implemented method comprising:
    providing a server comprising a plurality of containers and a plurality of physical processors;
    building a set of bit masks for each type of physical processor required for a logical partition, wherein the set of bit masks is of a length equal to an amount of a type of container chosen as a boundary;
    building a set of solution spaces based on the plurality of containers and an amount of each type of container of the plurality of containers;
    completing a combinatorial search of the set of bit masks and the set of solution spaces;
    identifying a solution space of the set of solution spaces for the logical partition; and
    changing a physical configuration and a logical configuration of the server based on the solution space for the logical partition.

2. The computer-implemented method of claim 1, wherein the plurality of physical processors comprises a plurality of types of physical processors, and wherein the plurality of containers comprises a plurality of types of containers.

3. The computer-implemented method of claim 2, wherein the plurality of types of containers comprises a drawer, a node, and a chip.

4. The computer-implemented method of claim 1, wherein the type of container chosen as the boundary is a chip.

5. The computer-implemented method of claim 1, wherein the boundary is the type of container pre-determined to house one type of physical processor.

6. The computer-implemented method of claim 1, wherein the solution space comprises a subset of the amount of the type of container chosen as the boundary.

7. A computer program product for isolating physical processors by processor type during optimization of virtual machine placement, the computer program product comprising:
    one or more computer readable storage media and program instructions stored on the one or more computer readable storage media, the program instructions comprising:
    program instructions to provide a server comprising a plurality of containers and a plurality of physical processors;
    program instructions to build a set of bit masks for each type of physical processor required for a logical partition, wherein the set of bit masks is of a length equal to an amount of a type of container chosen as a boundary;
    program instructions to build a set of solution spaces based on the plurality of containers and an amount of each type of container of the plurality of containers;
    program instructions to complete a combinatorial search of the set of bit masks and the set of solution spaces;
    program instructions to identify a solution space of the set of solution spaces for the logical partition; and
    program instructions to change a physical configuration and a logical configuration of the server based on the solution space for the logical partition.

8. The computer program product of claim 7, wherein the plurality of physical processors comprises a plurality of types of physical processors, and wherein the plurality of containers comprises a plurality of types of containers.

9. The computer program product of claim 8, wherein the plurality of types of containers comprises a drawer, a node, and a chip.

10. The computer program product of claim 7, wherein the type of container chosen as the boundary is a chip.

11. The computer program product of claim 7, wherein the boundary is the type of container pre-determined to house one type of physical processor.

12. The computer program product of claim 7, wherein the solution space comprises a subset of the amount of the type of container chosen as the boundary.

13. A computer system for isolating physical processors by processor type during optimization of virtual machine placement, the computer system comprising:
    one or more computer processors;
    one or more computer readable storage media; and
    program instructions stored on the computer readable storage media for execution by at least one of the one or more processors, the program instructions comprising:
    program instructions to provide a server comprising a plurality of containers and a plurality of physical processors;
    program instructions to build a set of bit masks for each type of physical processor required for a logical partition, wherein the set of bit masks is of a length equal to an amount of a type of container chosen as a boundary;
    program instructions to build a set of solution spaces based on the plurality of containers and an amount of each type of container of the plurality of containers;
    program instructions to complete a combinatorial search of the set of bit masks and the set of solution spaces;
    program instructions to identify a solution space of the set of solution spaces for the logical partition; and
    program instructions to change a physical configuration and a logical configuration of the server based on the solution space for the logical partition.

14. The computer system of claim 13, wherein the plurality of physical processors comprises a plurality of types of physical processors, and wherein the plurality of containers comprises a plurality of types of containers.

15. The computer system of claim 14, wherein the plurality of types of containers comprises a drawer, a node, and a chip.

16. The computer system of claim 13, wherein the boundary is the type of container pre-determined to house one type of physical processor.

17. The computer system of claim 13, wherein the solution space comprises a subset of the amount of the type of container chosen as the boundary.

* * * * *